(12) United States Patent
Georges

(10) Patent No.: US 9,723,116 B2
(45) Date of Patent: Aug. 1, 2017

(54) RESTRAINING SYSTEM FOR HANDHELD ELECTRONIC DEVICES

(71) Applicant: Jean Edrice Georges, Boynton Beach, FL (US)

(72) Inventor: Jean Edrice Georges, Boynton Beach, FL (US)

(*) Notice: Subject to any disclaimer, the term of this patent is extended or adjusted under 35 U.S.C. 154(b) by 211 days.

(21) Appl. No.: 14/246,119

(22) Filed: May 28, 2014

(65) Prior Publication Data

US 2016/0007723 A1      Jan. 14, 2016

Related U.S. Application Data

(63) Continuation-in-part of application No. 13/586,818, filed on Sep. 25, 2012, now abandoned.

(51) Int. Cl.
*A45F 5/00* (2006.01)
*H04M 1/04* (2006.01)

(52) U.S. Cl.
CPC .................. *H04M 1/04* (2013.01); *A45F 5/00* (2013.01); *A45F 2005/006* (2013.01); *A45F 2005/008* (2013.01); *A45F 2200/0516* (2013.01); *A45F 2200/0525* (2013.01)

(58) Field of Classification Search
CPC ....... H04M 1/04; A45F 5/00; A45F 2005/006; A45F 2005/008; A45F 2200/0516; A45F 2200/0525
See application file for complete search history.

(56) References Cited

U.S. PATENT DOCUMENTS

| | | | |
|---|---|---|---|
| 6,471,056 B1 | 10/2002 | Tzeng | |
| 7,469,809 B2 | 12/2008 | Rodarte et al. | |
| 7,529,364 B2 | 5/2009 | Buehler | |
| 7,650,007 B2 | 1/2010 | Iuliis et al. | |
| 8,328,055 B1 * | 12/2012 | Snyder | A45F 5/00 224/197 |
| 8,567,832 B2 * | 10/2013 | Kannaka | A45F 5/00 224/218 |
| 8,662,362 B1 * | 3/2014 | Bastian | H04B 1/3888 224/197 |
| 2002/0090099 A1 | 7/2002 | Hwang | |
| 2003/0066856 A1 * | 4/2003 | Lehtonen | A45F 5/02 224/675 |
| 2007/0184781 A1 | 8/2007 | Huskinson | |

(Continued)

*Primary Examiner* — Corey Skurdal
(74) *Attorney, Agent, or Firm* — PatentFile, LLC; Bradley C. Fach; Steven R. Kick

(57) ABSTRACT

A case-strap system for Handheld Electronic Devices having a case with direct or indirect attachments to receive a handheld electronic device, a strap directly or indirectly mounted on the back of said case with said attachments to receive a user's hand; a handheld electronic device is enclosed inside said case-strap unit, and said strap mounted on the back of said case stretched to receive and catch user's hand; unit is flipped to rest on top of user's hand or wrist; a case-strap is hooked with a lanyard, coupled with an earphone's audio cord attached on the surface or inserted between layers of said lanyard; one end of earphone's audio cord is connected to the device's audio jack and to a user's ear(s); a case-strap unit is enclosed into a magnetized wrist strap system to carry, hold, or manage the handheld electronic device inside said case-strap unit.

12 Claims, 12 Drawing Sheets

(56) References Cited

U.S. PATENT DOCUMENTS

| | | | | |
|---|---|---|---|---|
| 2010/0327030 A1* | 12/2010 | Yang | ............ | A45F 5/00 |
| | | | | 224/199 |
| 2011/0019861 A1 | 1/2011 | Wolfe | | |
| 2013/0072266 A1 | 3/2013 | Shattuck et al. | | |
| 2013/0221189 A1* | 8/2013 | Kubin | ............ | F16M 13/04 |
| | | | | 248/683 |
| 2015/0341477 A1* | 11/2015 | Torres | ............ | H04M 1/04 |
| | | | | 455/575.6 |
| 2016/0018849 A1* | 1/2016 | Tilney | ............ | A45F 5/00 |
| | | | | 224/267 |
| 2016/0106202 A1* | 4/2016 | Ford | ............ | A45C 13/1069 |
| | | | | 224/267 |

* cited by examiner

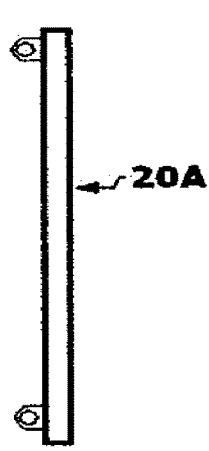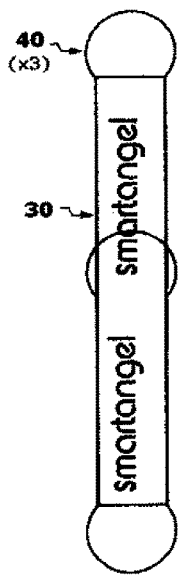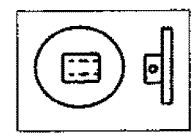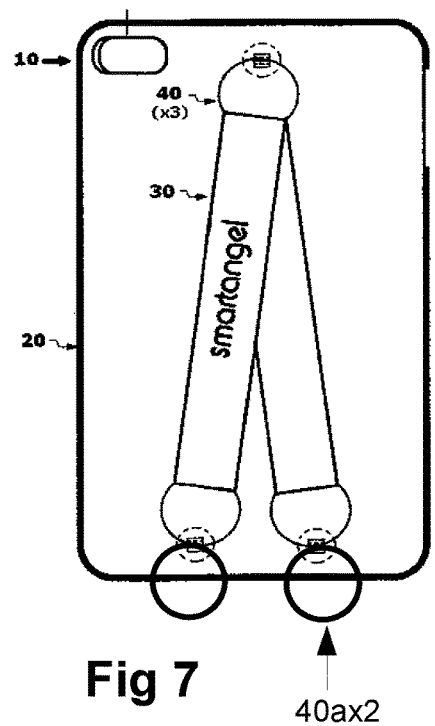
Fig 4     Fig 5     Fig 6
Fig 7

FIG. 7A
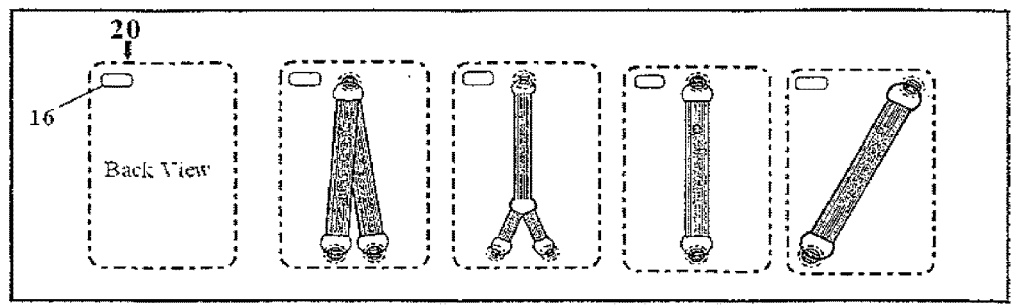
FIG. 7B
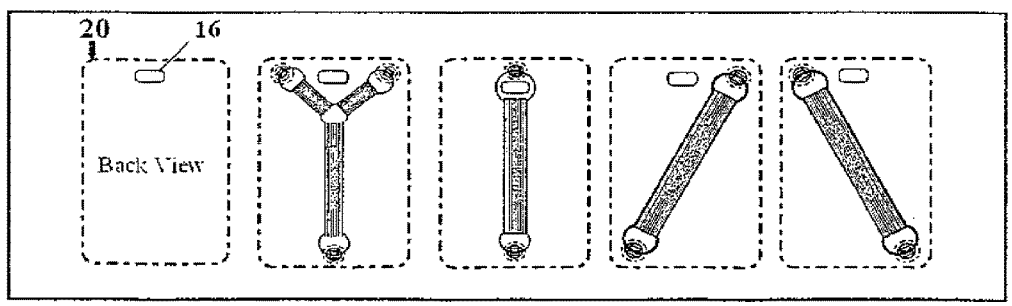
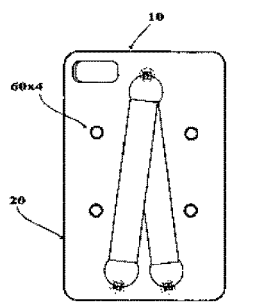
Fig 7C
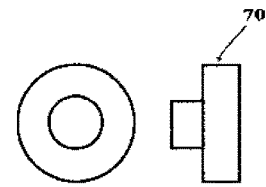
Fig 7D
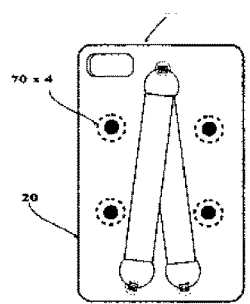
Fig 7E
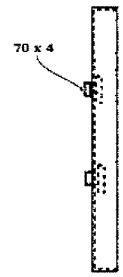
Fig 7F

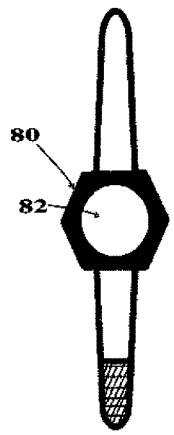
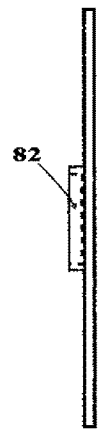
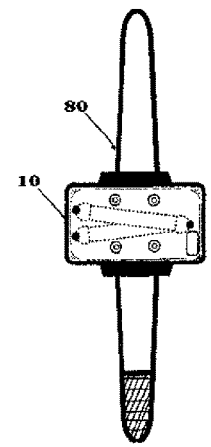
FIG. 25  FIG. 26  FIG. 27
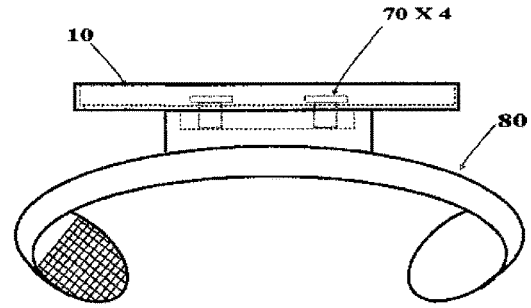
FIG. 28
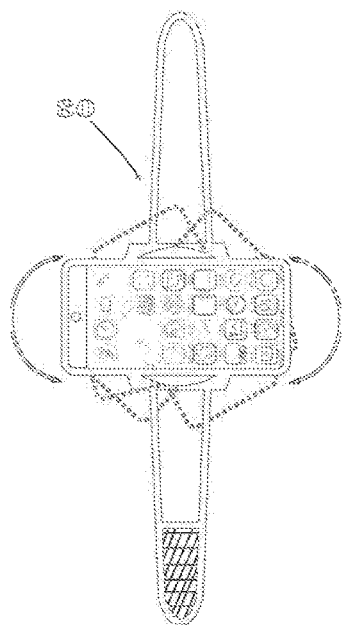
FIG. 29
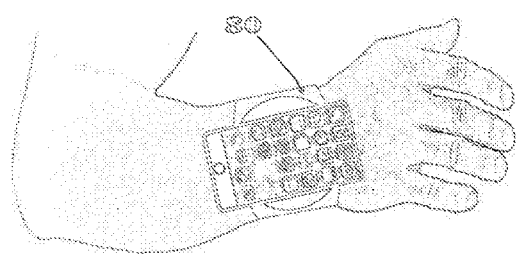
FIG. 30

RESTRAINING SYSTEM FOR HANDHELD ELECTRONIC DEVICES

CROSS REFERENCE TO RELATED APPLICATIONS

This is a continuation in part of Ser. No. 13/586,818, filed on Aug. 15, 2012.

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

1. Field of the Invention

The present invention relates generally to the field of protective cases or covers that are separately made to protect or cover hand held computers. More specifically, the present invention relates to a case or cover, joined with straps to form a case-straps unit which is intended to receive a hand held electronic device. Such case-straps unit helps secure said hand held computers to users' hand, wrist or neck, ensuring their technology stays tethered, and not splayed on the floor and left behind.

2. Description of the Related Arts

The closest reference corresponds to U.S. Pat. No. 6,471,056 issued to Kuo-Chen Tzeng on Oct. 29, 2002, U.S. Pat. No. 7,469,809 B2 by Luis Ernesto Elizalde Rodarte; U.S. Pat. No. 2013/0072266 A1; U.S. Pat. No. 7,650,007 B2; U.S. Pat. No. 2002/0090099 A1; U.S. Pat. No. 20110019861.

Referring to U.S. Pat. No. 7,469,809 B2 by Luis Ernesto Elizalde Rodarte. Mr. Ekizalde invented a PDA with a built-in hand strap designed to help users overcome hand fatigue and so forth. The main problem with this invention is the fact that he had to add an expensive feature in order to accommodate both right and left handed users. Unable to find a unique way to balance user's hand while holding the device, the inventor came up with a sliding mechanism located in the back of the PDA so users may setup the strap whether to the left or to the right, according to their needs.

His invention however differs from the present invention in many ways.

One main difference between the two inventions is the fact that the present invention is being built separately, around a case, from the hand held device it is intended to receive, while the named prior art is being built during a manufacturing process with the device it is intended to protect.

Another significant difference between the two inventions is the fact that the present invention accomplished the same result claimed by the named prior art, but in a less expensive way. Because of the hand strap's duo legs and its location in the middle of the case, the current invention offers both left and right hand users a better way to manage the enclosed device with no further actions in their part.

Referring to U.S. Pat. Application No. 2013/0072266 A1. This application relates to a new subject matter that is about to be included in this application, which is the integration of a wired earphone's audio cord into the neck lanyard. A neck strap lanyard was already mentioned in the original application, but is now being coupled with a wired earphone system to allow a more hand free usage of the case-straps system unit.

The applicant of application number 2013/0072266 A1 tried to claim a case combined with a lanyard's integrated earphone or headphone.

Again, as far as the new subject matter is concerned, the mentioned invention differs from the present invention in many ways.

One way application number 2013/0072266 A1 differs from the present invention is because, contrary to the present invention, the lanyard must be attached with the case all the time in order for the headphone system or the whole invention to work properly. In other words, the claimed case of the application 2013/0072266 A1 is useless without the lanyard, while the claimed lanyard is also useless without the claimed case.

My invention on the other hand allows the case-straps unit to work simultaneously or independently with or without the neck lanyard.

Application number 2013/0072266 A1 is also differs from my invention simply because a magnet system is to be used to join the case with a double ends lanyard's integrated headphone, while said lanyard of said current invention joined the case from a single or duo point of contact.

Finally, application number 2013/0072266 A1 doesn't meet the requirements of a prior art. Since the application No. 2013/0072266 A1 has a priority filing date dated after this invention's original filing date, the USPTO should not use or refer to it as a prior art when considering this application.

Other inventions include: U.S. Pat. No. 7,529,364 B2; U.S. Pat. No. 2007/0184781 A1;

These inventions differ from the present invention because they don't prevent the protected device from falling off the user's hand or from leaving the device behind, nor do they offer a better protection system than the current invention which includes hand strap, wrist strap, neck strap with integrated earphone, headphone and the like.

Other patents describing the closest subject matter provide for a number of more or less complicated features that fail to solve the problem in an efficient and economical way. None of these patents suggest the novel features of the present invention.

BRIEF SUMMARY OF THE INVENTION

The primary object of the invention is to provide a protective case or cover for cell phones and other hand held electronic devices.

Another object of the invention is to provide a protective case or cover that secures a cell phone and other hand held electronic devices to a user's hand while in use, without the need for the user to hold on such a device.

Another object of the invention is to provide a protective case or cover for a cell phone and other hand held devices with means that prevent such devices from accidental fall, with no need to have a hand on the device.

A further object of the invention is to provide a protective case or cover for cell phones and the like that allows users to keep their devices around them and out of their hands while not in use, so they can perform other tasks and activities.

Yet another object of the invention is to provide a solution for such an important problem that is less expensive to manufacture and yet delivers a better result than similar.

Still yet another object of the invention is to provide a protective case or cover for cell phones and hand held computer tablets that allows users to hang their devices around their neck by means of hooks, rings, and strap, adding convenience, control, and portability when handling more than one device at the same time.

Another object of the invention is to provide a protective cover for cell phones and other hand held electronic devices that is user friendly to people who suffers from handicaps and hand related illnesses.

Another object of the invention is to provide a neck strap or lanyard with an integrated wired earphone/headphone or audio and the like, to prevent the lost of such earphone, headphone, audio, and to better manage the earphone's cord in front the user.

Another object of the invention is to provide a detached wrist strap for extra convenience to users who prefer to manage their device complete hand free.

Other objects and advantages of the present invention will become apparent from the following descriptions, taken in connection with the accompanying drawings, wherein, by way of illustration and example, an embodiment of the present invention is disclosed.

Further objects of the invention will be brought out in the following part of the specification, wherein detailed description is for the purpose of fully disclosing the invention without placing limitations thereon.

In accordance with a preferred embodiment of the invention, there is a disclosed case-straps unit for hand held electronic devices comprising: a case, intended to receive a hand held device, with attachment means on the back of said case; a hand strap being mounted on the back of said case by mean of said attachments to receive a user's hand or finger; a neck strap lanyard integrated with a wired earphone, headphone, or audio, hooked with said case-straps unit as to carry said unit around said user's neck; a magnetized wrist holder to hold and carry said case-straps unit around said user's wrist.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention. With the above and other related objects in view, the invention consists in the details of construction and combination of parts as will be more fully understood from the following description, when read in conjunction with the accompanying drawings in which:

FIG. 4 is a side view of FIG. 3

FIG. 5 is the assembly of the elastic strap (non-stretched or unfolded) with the rings.

FIG. 6 represents the front and side view of a hook.

FIG. 7 is the assembly of a stretched and folded elastic strap with a preexisting protective case or cover.

FIG. 7A represents different strap locations where a case is designed to fit a device with a camera located in the center top of the device.

FIG. 7B represents different locations of said strap where a case is designed to fit said device that has a camera located in the upper left corner of such said device.

FIG. 7C is a back view of said case assembly showing 4 clearance holes.

FIG. 7D is the front and side view of a magnet.

FIG. 7E is the back view of the case assembly in FIG. 7C showing 4 pieces of magnets being installed.

FIG. 7F is a side view of FIG. 7E showing the installed magnet from the side.

FIG. 7G Shows a front view of a case assembly with 4 pieces magnets seen from the inside.

FIG. 7H is the side view of FIG. 7G.

FIG. 11C shows a user carrying a device with a neck strap while using an earphone, headphone, audio, and the like.

FIG. 11D shows a cross sectional rear view of the of a neck strap that has a wired earphone, headphone, and the like.

FIG. 11F shows the rear view of a user using the earphone, headphone, and the like.

FIG. 25 shows a magnetic wrist case-straps unit holder.

FIG. 26 is a side view of FIG. 25.

FIG. 27 shows a front view of the case-straps system assembled with a magnetic wrist case-straps holder.

FIG. 28 depicts a side view of FIG. 27.

FIG. 29 shows a front view of the case-straps system holding a cell phone, and assembled with the magnetic wrist case-straps system holder.

FIG. 30 depicts the magnetic wrist case-straps system holder in use.

DETAILED DESCRIPTION OF THE PREFERRED EMBODIMENTS

Figure 1:
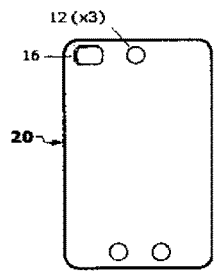
FIG. 1 represents a back view of an existing protective case or cover being modified with holes for the present invention.
Figure 2:
FIG. 2 is a side view of FIG. 1

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Referring now to the drawings, where said case-straps unit, which is intended to receive a hand held electronic devices, is generally referred with numeral 10 and 10A, it can be observed that it basically includes cases 20, 20A, 20B, device 20C, elastic strap 30, adhesive plate 30A, rings 40, and hooks 50.

Figure 3:
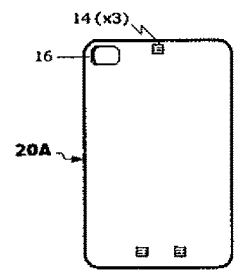
FIG. 3 represents a back view of a newly molded protective case or cover with built-in hooks.
Figure 3A:
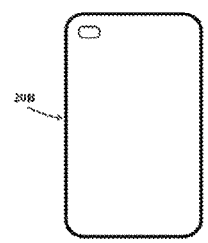
FIG. 3A is the front view of an unmodified original case.
Figure 3B:
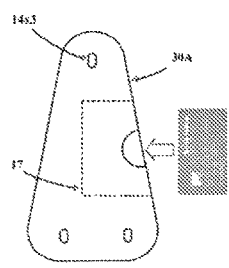
FIG. 3B is the front view of an adhesive plate with card holder and hooks.
Figure 3C:
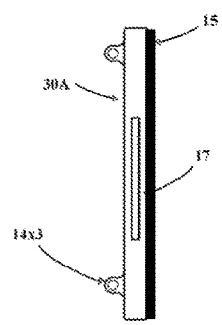
FIG. 3C is a side view of the plate is FIG. 3B.
Figure 3D:
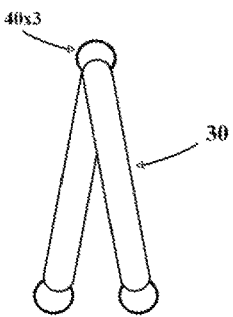
FIG. 3D is the front view of a folded strap with attachment rings.

Referring now to FIGS. 1, 2, 3, 3A, and 4, it can be seen that said case-straps unit 10 and 10A may be made out of an existing case 20 as well as a custom made case 20A and 20B. In the event of an existing case 20, clearance holes 12 are being located in the case 20 as attachment means, but for a custom made case 20A, attachment means are the molded or the built-in edges or hooks 14. However, another custom made case can also be made using a molded adhesive plate 30A that has an adhesive backed 15 to be affixed on top of an unmodified existing case 20B as seen in FIGS. 3F and 3G. Such adhesive plate 30A includes built-in edges or hooks 14 that are intended to receive strap 30 with attachments 40, as seen in FIG. 3D.

Figure 3E:
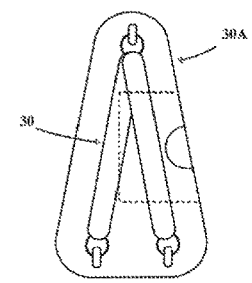
FIG. 3E is the assembly of the plate and strap shown in FIGS. 3C and 3D.
Figure 3F:
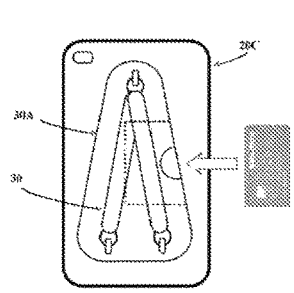
FIG. 3F is the assembly of the case, and plate with strap.
Figure 3G:
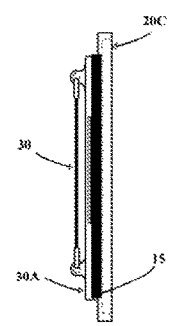
FIG. 3G is the side view of FIG. 3F.
Figure 3H:
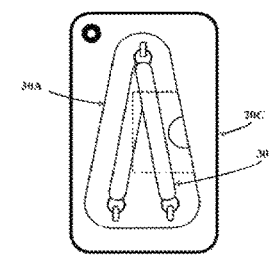
FIG. 3H shows the plate assembly being affixed directly on the back of a hand held electronic device.
Figure 8:
FIG. 8 is a side view of FIG. 7 showing said elastic strap and said hooks.
Figure 9:
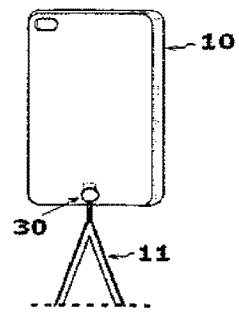
FIG. 9 depicts a case with a neck strap hooked at the bottom of said case.
Figure 9A:
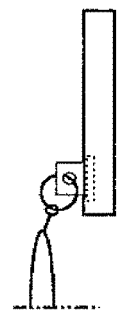
FIG. 9A is a side view of FIG. 9

On the other hand, adhesive plate assembly shown in FIG. 3E which includes adhesive plate and hooks 30A and strap with attachment 30A, may also be affixed directly on top of an uncased hand held electronic device 20C, as seen in FIG. 3H.

Meanwhile, adhesive plate assembly shown in FIG. 3E includes slot 17 which, when placed on top of a case or a hand held electronic device, can make the plate function like a wallet to store things like credit cards or any other things usually stored inside a wallet.

Referring now to FIG. 5, elastic strap 30 comprises 2 end rings and one middle ring 40.

Figure 12:
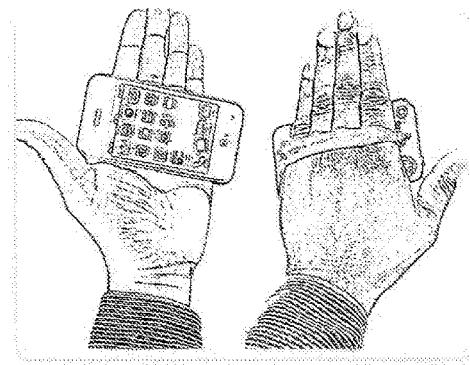
FIG. 12 shows a hand trapped between the back of a case and an elastic strap.

Referring now to FIG. 7, said case-straps unit 10 includes an elastic strap 30, attached to said case 20 through hooks or attachments 50, by means of rings 40. Note that a fourth and fifth rings 40a are being located at the bottom right end of the elastic strap 30. Said rings 40a are to be used to hook neck lanyard 11 whether single or double end. These two rings 40a, when used simultaneously to hook a single end lanyard, may help reducing the bouncing effect of said case-strap unit that usually took place while walking. Said elastic strap 30, after being connected to said hooks 50, can be stretched out as to catch a human's hand between the back of said case 20, as pictured in FIG. 12. The location of strap 30 on said case 20 depends on the location of clearance opening 16 in said case 20 as shown in FIGS. 7A and 7B.

Referring now to FIG. 7C, said case-straps unit 10 includes 4 clearance holes 60 as to receive magnets 70, as shown in FIG. 7D. This allow said case-straps unit 10 to attach to magnetic wrist holder 80.

Referring to FIG. 7E, said magnets 70, seen from the outside, are being installed through clearance holes 60 in said case-straps unit 10 from the inside, as shown in FIG. 7F.

Referring now to FIG. 7G, said magnets 70, seen from the inside or the front of said case-straps unit 10. The larger end of said magnets 70 is to be placed inside said case-straps unit 10 as shown in FIGS. 7G and 7H, while its lesser end points toward the outside of said unit as shown in FIGS. 7E and 7F.

Referring to FIGS. 25 and 26, a magnetized wrist strap holder 80 is shown with a magnetic field 82, intended to receive said case-straps unit 10, shown in FIG. 7G. Said magnets 70, assembled with said case-straps unit 10, are being located inside the magnetic field or space 82, and coupled with said magnetic wrist's case-strap holder 80, as seen in FIGS. 27 and 28.

Said magnetic case-straps holder 80 can hold a hand held device through said case-straps unit 10, and be carried or used around a wrist, as shown in FIG. 30. It is to be noted that a hand held device, while located inside said case-straps unit 10, can be rotated up to 360 degree angle, as shown in FIG. 29.

Referring now to FIGS. 9, 9A, 10, and 11, said case-straps unit 10 may also include only said case 20 with hook 50, rings 40, ring 40a, and neck strap 11. Said case-straps unit 10 is also designed to hook with a neck strap 11 through bottom end ring 40a that shares said hook 50 with said elastic strap 30, as shown in FIG. 7. It is to be noted that ring 40a, with one hook 50, can be relocated around said case-straps unit 10 as to create an attachment mean, if needed.

Figure 10:
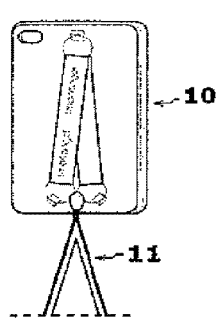
FIG. 10 shows a case with a hand strap and a neck strap.
Figure 11:
FIG. 11 shows a neck-strapped phone in use

Neck strap 11 is being hooked to said case case-straps unit 10, portrayed in FIG. 10, as to allow usage of a hand held device while still being strapped around the neck, as shown in FIG. 11.

Figure 11A:
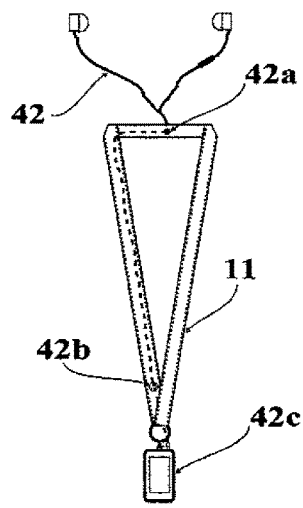
FIG. 11A shows the front view of said strap without buckle, carrying a wired earphone, headphone, audio, or the like, that connects with said device to the user's ears.

Referring to FIG. 11A, a one-piece (no buckle) neck strap 11, made out of one or two layers materials is combined with a wired earphone, headphone 42, and the like. The cord of wired earphone, headphone or audio 42 gets through neck strap 11 between layers from access hole 42a and then exit said neck strap 11 through access hole 42b where one end of said wired earphone's audio cord 42 is connected to the audio output jack of device 42c.

Cord from wired earphones, headphones or audio can be very messy when it comes to hanging wires over users' clothing. Beside, wired earphones or audio can be easily lost when not in use. Now, most users inconveniently insert the earphone's audio cord under their shirts or tops to better control them. earphone's audio cord's wired neck strap, when used in conjunction with the current invention, allows users to better manage the cord around them when using their devices, while at the same time offers them convenience and money saving opportunity in protecting their investments from being lost or misplaced.

Figure 11B:
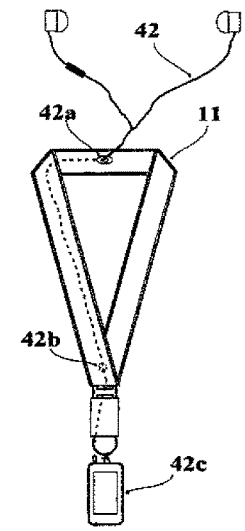
FIG. 11B shows the front view of said strap with buckle, carrying a wired earphone, headphone, audio, and the like that connects with said device to the user's ears.

Referring to FIG. 11B, a two-piece (with buckle) neck strap 11 integrated with a wired earphone's audio cord 42. Wired earphone 42 gets into neck strap 11 from access hole 42a and exit neck strap 11 through access hole 42b where one end of wired earphone's audio cord 42 is connected to the audio output jack of device 42c.

Figure 11C:
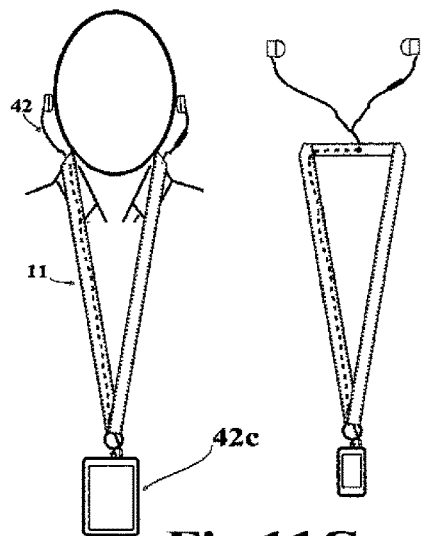

Referring to FIG. 11C, The neck strap 11, assembled with a wired earphone or ear audio 42, is in use where one end of the wired earphone's audio cord 42 is being connected with the audio jack of the device 42c, while the other end or the wired earphone's audio cord 42 is being fitted into the user's ear(s).

Figure 11D:
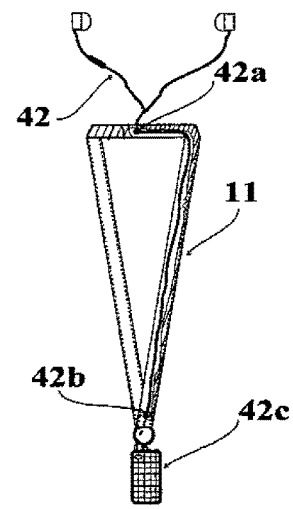

Referring to FIG. 11D, a one-piece (no buckle) neck strap 11 is being integrated with a wired earphone's audio cord 42. A cross sectional view from the back shows access hole 42a, and the path of the wired earphone's audio cord 42 inside the strap where the wired audio 42 is being inserted in-between a 2 layers neck strap. Wired earphone's audio cord 42 gets through the neck strap 11 from access hole 42a and exit neck strap 11 to access hole 42b where one end of wired earphone's audio cord 42 is connected to the audio output jack of device 42c.

Figure 11E:
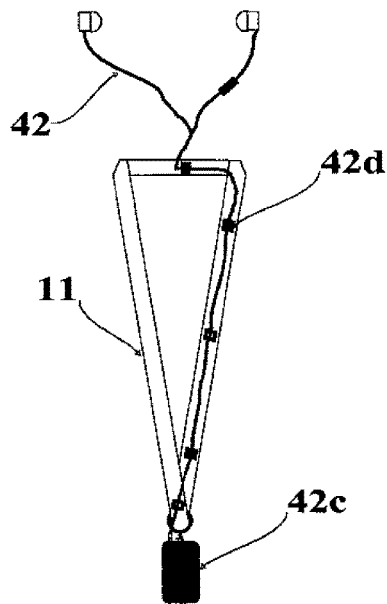
FIG. 11E shows a wired earphone mounted on the rear of a neck strap using retaining means.

A wired earphone's audio cord can also be joined together with a one layer neck strap using attaching means 42d as shown in FIG. 11E.

Figure 11F:
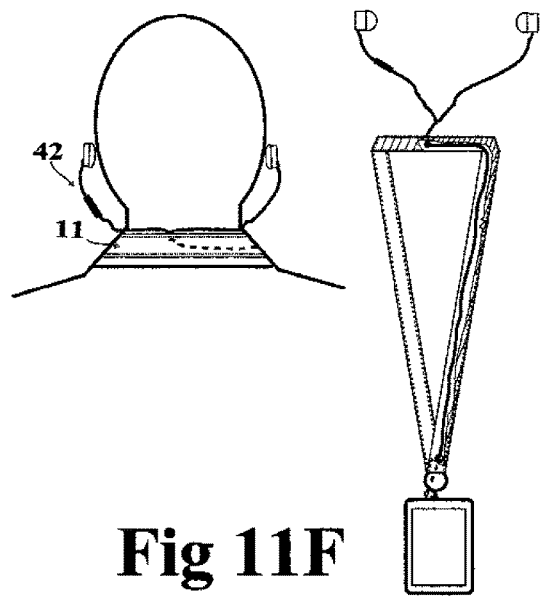

Referring now to FIG. 11F, wired earphone's audio cord 42 seen in use from the back inside said neck strap 11.

Figure 11G:
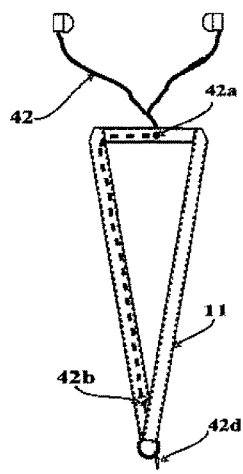
FIG. 11G shows a neck strap with a wired audio phone that has no object or device attached to the end of the cord.

Referring to FIG. 11G, a wired earphone's audio cord 42 is being assembled with said neck strap 11 having an end audio plug 42d ready to be connected with an object or device.

Figure 11H:
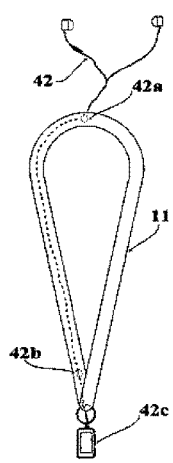
FIG. 11H shows a neck strap made out of a hollow fabric or material, having a wired earphone, headphone or audio cord through the hollow.
Figure 11I:
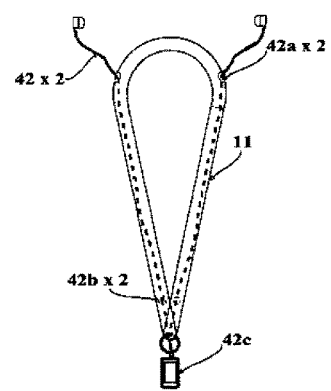
FIG. 11I depicts with a neck strap integrated with a wired earphone with wires on both side of the lanyard.
Figure 11J:
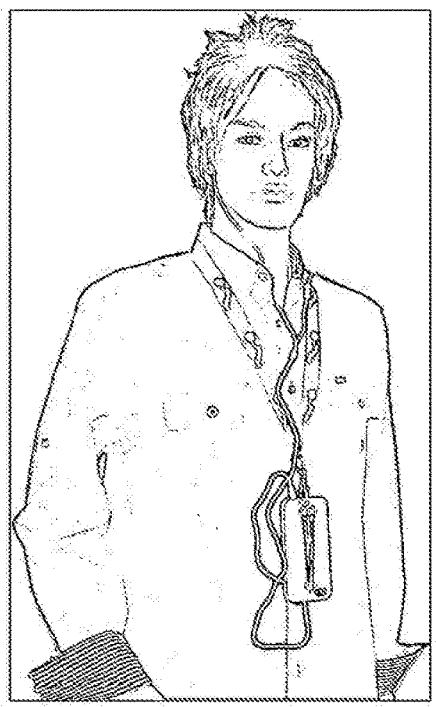
FIG. 11J shows two hand held devices in use with lanyards with and without earphone integration.
Figure 11J:
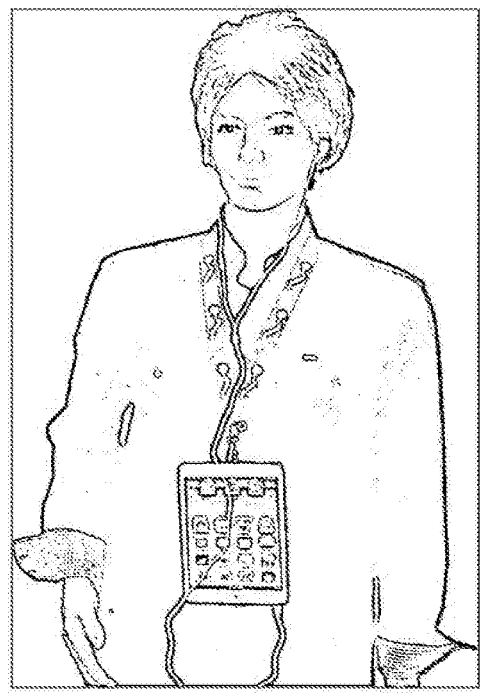
Figure 11J:
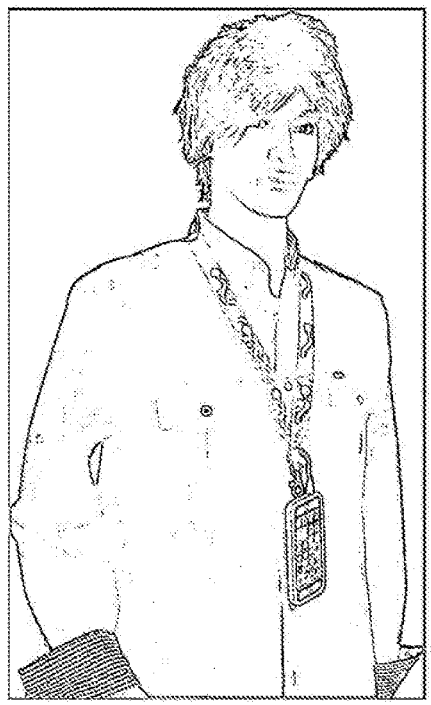
Figure 11J:
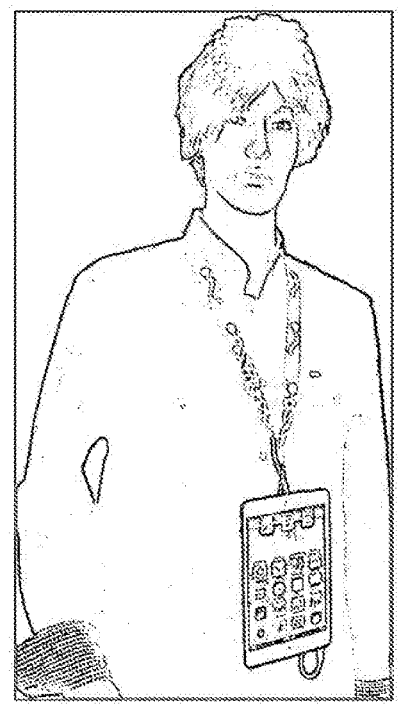
Figure 11K:
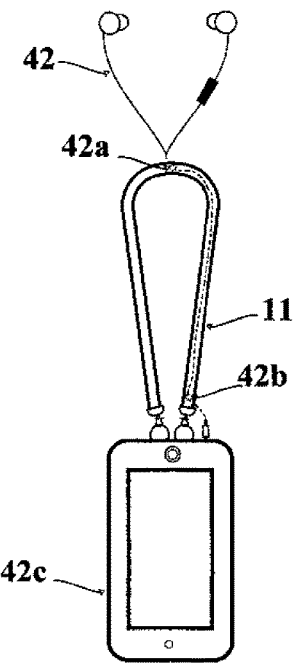
FIG. 11K shows the front view of a case-strap unit attached with an integrated lanyard-earphone system where the lanyard has multiple hooks.
Figure 11L:
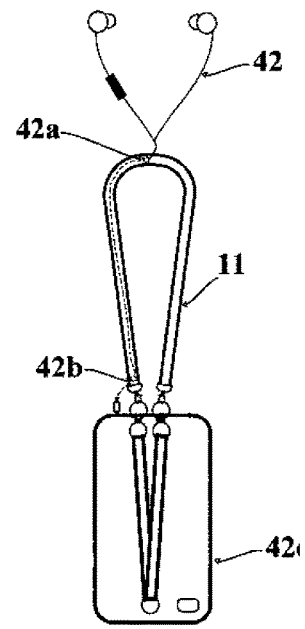
FIG. 11L shows the back view of a case-strap unit attached with an integrated lanyard-earphone system where the lanyard has multiple hooks.
Figure 11M:
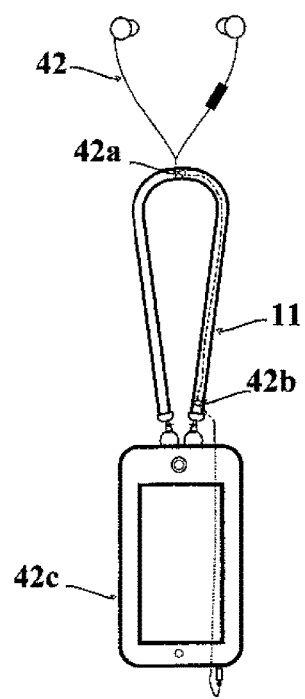
FIG. 11M shows a front view of an integrated lanyard-earphone system connected with a hand held mobile device that has its audio output facing down while trapped around the user's neck.

A neck strap or lanyard can be made out of different type of fabrics or material with different shapes and sizes to receive the wired earphone's audio cord. Such fabrics (and) or materials may include hollows, as depicted in FIG. 11H.

Figure 13:
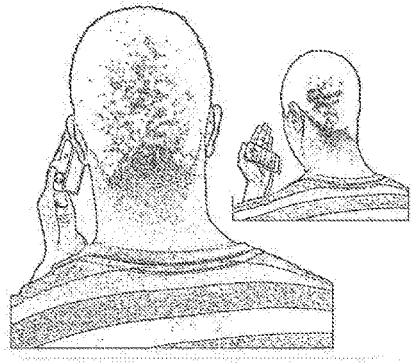
FIG. 13 shows a hand-strapped device in use.
Figure 14:
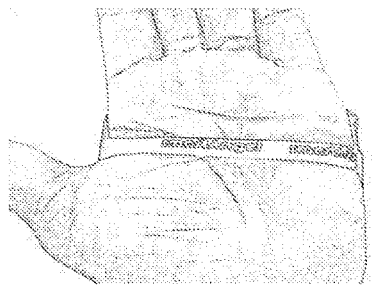
FIG. 14 shows a hand-strapped device being flipped behind a user's hand.
Figure 15:
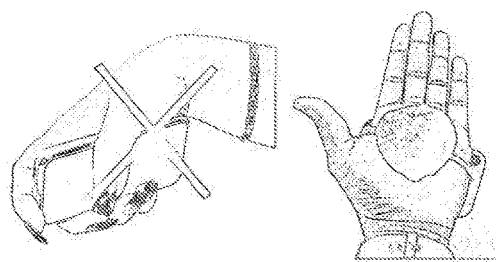
FIG. 15 shows the contrast between conventional cell phone holding and back flipped cell phone holding.
Figure 16:
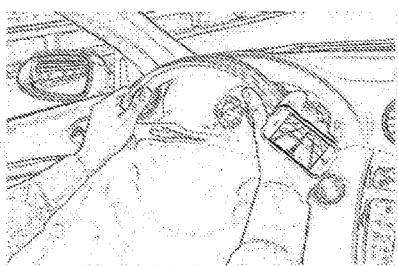
FIG. 16 pictured a driver with a cell phone flipped behind his hand, and still has both hands on the wheel.
Figure 17:
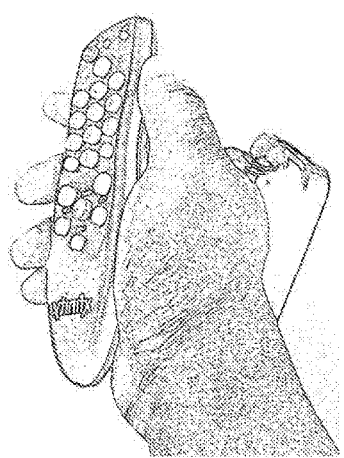
FIG. 17 shows a hand holding a remote with the cell phone rested behind the hand.
Figure 18:
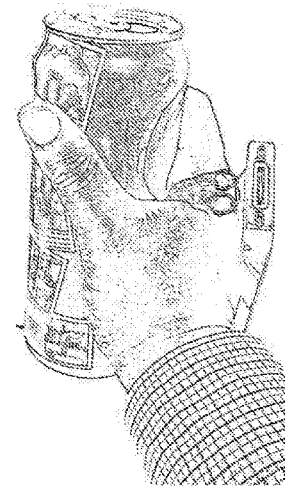
FIG. 18 shows a hand holding a canned drink while the cell phone is comfortably rested behind the hand.

Referring to FIGS. 12, 13, 14, and 15, once a hand is being trapped between said elastic strap 30 and said case 20, such cell phone or computer tablet located inside said case-straps unit 10 can be used un-gripped (hold free) and may also becomes drop free. Therefore, a cell phone can be conveniently used through ear or mouth hold free, as shown in FIG. 13. Also, a mobile device that is inserted in said case-straps unit 10 may be flipped behind hand when such a cell phone is not in use as shown in FIG. 14. This allows the cell phone user to use his or her hand for other things, as shown in FIG. 15.

Figure 19:
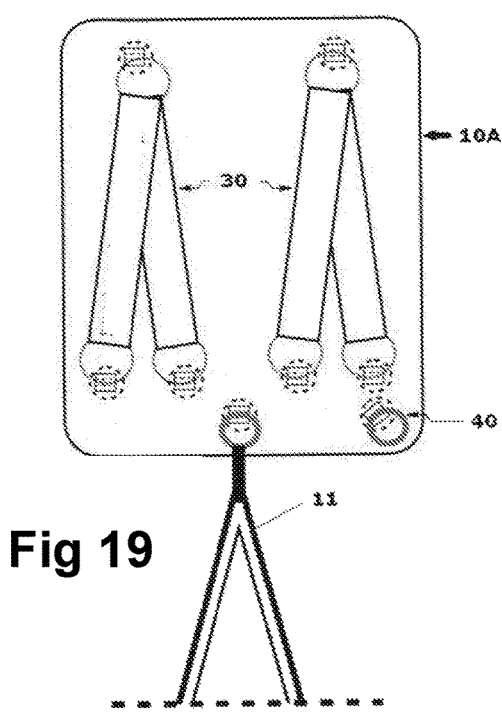
FIG. 19 illustrates a back case of a larger device with two sets of elastic straps and a neck strap.
Figure 20:
FIG. 20 shows a larger device being neck-strapped.
Figure 21:
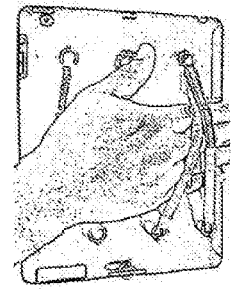
FIG. 21 represents a larger device hand-strapped with a right hand.

Referring now to FIGS. 19, 20, 21, duo elastic strap 30 is used when said case 20 is designed to fit a larger hand held computer as shown in FIG. 19. The left and right strap 30 is to accommodate users whether they are left handed or right handed, as shown in FIG. 21. Large case-straps unit 10A is also capable of receiving neck strap 11 (shown is FIGS. 19 and 20) which is being connected to said case 20 by mean of hook 50 and ring 40.

Figure 22:
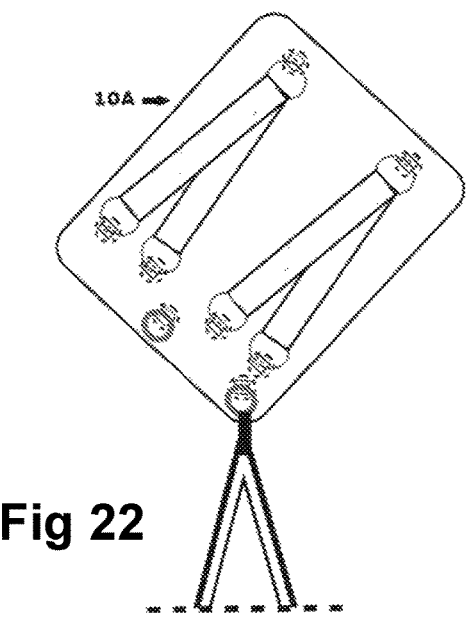
FIG. 22 depicts a larger device with a neck strap being hooked in the lower right hand corner.
Figure 23:
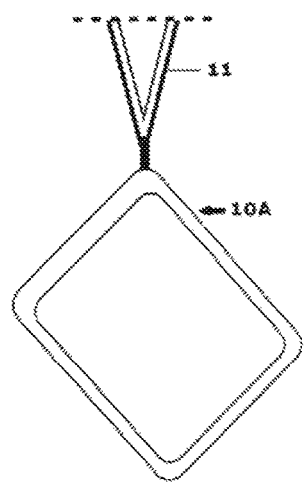
FIG. 23 shows a tilted larger device being held with a neck strap from the lower right hand corner.
Figure 24:
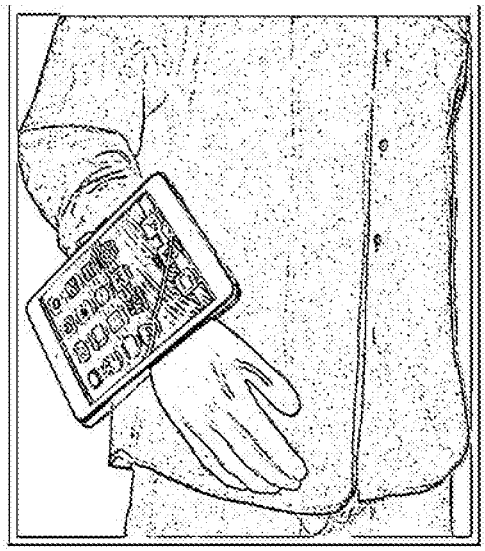
FIG. 24 shows pictures of the case-trap system being used or carried around a user's wrist.
Figure 24:
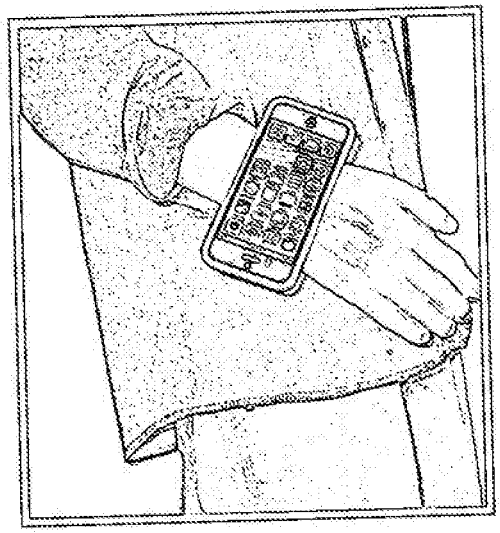

Referring now to FIGS. 22 and 23, case-straps unit 10A includes an additional hook 50 and ring 30 located at the bottom right corner of said case 20, designed to receive said neck strap 11, as shown in FIG. 22. Said case-straps unit 10A will then be tilted when neck-strapped. Tilting said case-straps unit 10A, as shown in FIG. 23, will make it easier to use tablet computers whether vertical or horizontal while still being strapped around the neck.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A hand held electronic device restraining system, the system comprising:
   a case strap unit configured to receive a hand held electronic device, the case strap unit having a front side for receiving and holding an entire body of the hand held electronic device and a back side comprising a plurality of magnets, the plurality of magnets projecting from the back side of the case strap unit; and
   a magnetized wrist strap holder, the magnetized wrist strap holder comprising a wrist strap configured to be worn on the wrist of a user and a circular space cavity formed within the magnetized wrist strap holder, the circular space cavity comprising a magnetic field configured to attract the magnets projecting from the back side of the case strap unit, and wherein the circular space cavity of sufficient diameter to fully receive all of the plurality of magnets from the case strap unit allowing the plurality of magnets to rotate within the circular space cavity.

2. The system of claim 1, wherein the circular space cavity has a diameter width wider than the wrist strap.

3. The system of claim 1, wherein each of the plurality of magnets has a larger end having a width and a lesser end having a width, the larger end width being greater than the lesser end width.

4. The system of claim 3, wherein the case strap unit front side comprises a plurality of clearance holes, the clearance holes having diameters suitable to receive only the lesser ends of the plurality of magnets while not permitting the larger ends of the plurality of magnets to pass through the clearance holes.

5. The system of claim 1, wherein the case strap unit further comprises a strap coupled to the back side, the strap having a first end and a second end and the strap configured to allow the case strap unit to be worn around the hand of a user.

6. The system of claim 5, wherein the strap passes through a middle ring and the middle ring is coupled to the back side of the case strap unit.

7. The system of claim 5, wherein the first end of the strap is coupled to a first end ring and the second end of the strap is coupled to a second end ring.

8. The system of claim 7, wherein the first and second end rings are coupled to a neck lanyard.

9. The system of claim 8, wherein the neck lanyard comprises a wired earphone audio cord within the neck lanyard.

10. The system of claim 1, wherein the back side of the case strap unit comprises an adhesive plate.

11. The system of claim 10, wherein the adhesive plate is coupled to a middle ring, the middle ring securing a strap.

12. The system of claim 10, wherein the adhesive plate comprises a slot configured to hold a credit card.

* * * * *